United States Patent [19]

Chen

[11] Patent Number: 4,711,166

[45] Date of Patent: Dec. 8, 1987

[54] AUTOMATIC MACHINE FOR MAKING STONE FRUIT BISCUIT

[76] Inventor: Tsai A. Chen, 201 Sec. 3, Ba-Dar Road, Taipei, Taiwan

[21] Appl. No.: 22,367

[22] Filed: Mar. 5, 1987

[51] Int. Cl.⁴ ............................................. A47J 37/00
[52] U.S. Cl. ........................................ 99/353; 99/355; 99/341; 99/423; 99/443 C; 99/450.1
[58] Field of Search ................. 99/355, 341, 345, 349, 99/324, 423, 443 C, 450.1, 353, 352

[56] References Cited

U.S. PATENT DOCUMENTS

| 3,349,724 | 10/1987 | Tavan | 99/355 X |
| 3,526,472 | 9/1970 | Remensperger et al. | 99/353 |
| 3,718,487 | 2/1973 | Brunner | 99/353 |
| 4,339,993 | 7/1982 | Lee | 99/355 |
| 4,481,872 | 11/1984 | Matthews et al. | 99/353 |
| 4,515,819 | 5/1985 | Shinriki | 99/450.1 |
| 4,535,687 | 8/1985 | Antpohler | 99/355 X |
| 4,583,451 | 4/1986 | Kanagy | 99/423 |

Primary Examiner—H. Hampton Hunter
Attorney, Agent, or Firm—Sherman and Shalloway

[57] ABSTRACT

An automatic machine for making stone fruit biscuit in seven consequent steps to make stone fruit biscuit, that is, material reserving, material restoring, planing, sucking, moulding, baking and cooling. Correspondingly, this invention comprises a material reserving means, a material restoring means, a planing means, a suction means, a moulding means, a baking means and a cooling means.

5 Claims, 15 Drawing Figures

AUTOMATIC MACHINE FOR MAKING STONE FRUIT BISCUIT

BACKGROUND OF THE PREFERRED EMBODIMENTS OF THIS INVENTION

This invention relates to an automatic machine for making stone fruit biscuit, particularly to me which makes stone fruit biscuit in seven consequent steps, that is, material reserving, material restoring, planing, sucking, moulding, baking and cooling.

One object of this invention is to provide an automatic machine for making stone fruit biscuit which applies two material conveying tube rows 210 and a cutting blade to alternatively cut and refill the material the material being cut in a uniform thickness.

Another object of this invention is to provide an automatic machine for making stone fruit biscuit which applies a suction means to convey the planed stone fruit biscuits to a moulding means.

Still another object of this invention is to provide an automatic machine for making stone fruit biscuit which may coat the base and surface dough to the stone fruit biscuits conveyed by the suction means.

Yet still another object of this invention is to provide an automatic machine for making stone fruit biscuit which applies a cooling means to from the moulded stone fruit biscuits in a curved shape.

Other objects, merites and a fuller understanding of the present invention will be obtained by those having ordinary skill in the art when the following detailed description of the best mode contemplated for practicing the invention is read in conjunction with accompanying drawings wherein like numerals refer to like or similar parts and in which:

DETAILED DESCRIPTION OF PREFERRED EMBODIMENTS OF THIS INVENTION

This invention relates to an automatic machine for making stone fruit biscuit.

Figure 1:
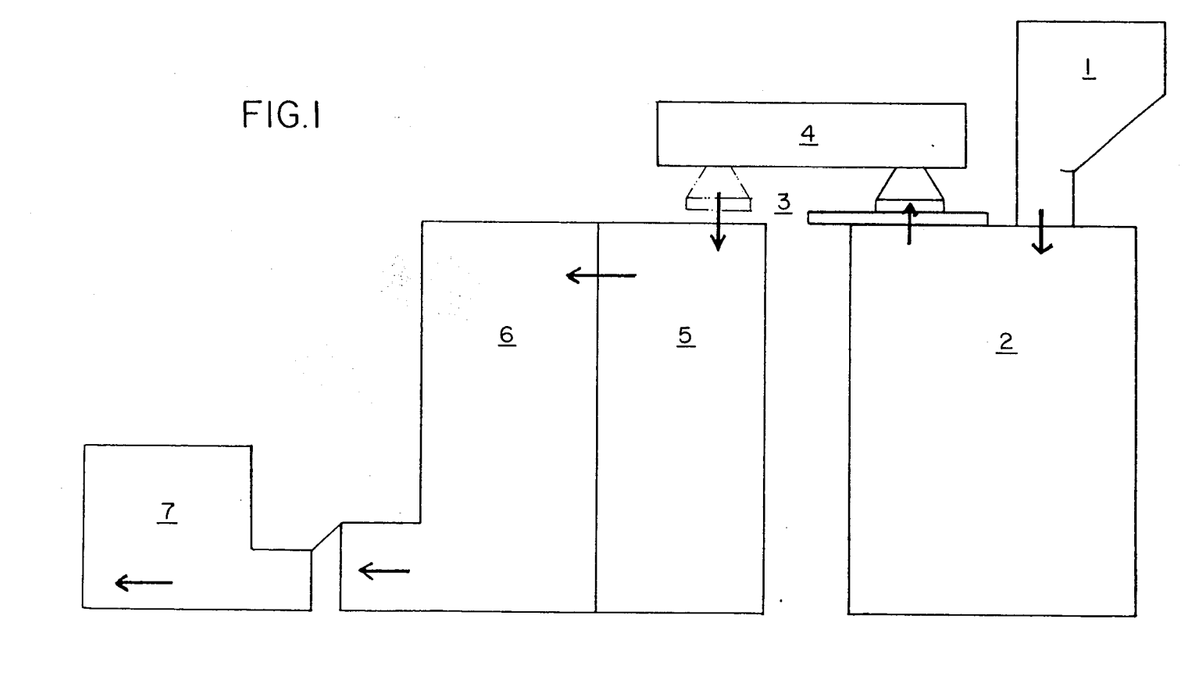
FIG. 1 is a block diagram of a preferred embodiment of this invention.
Figure 2:
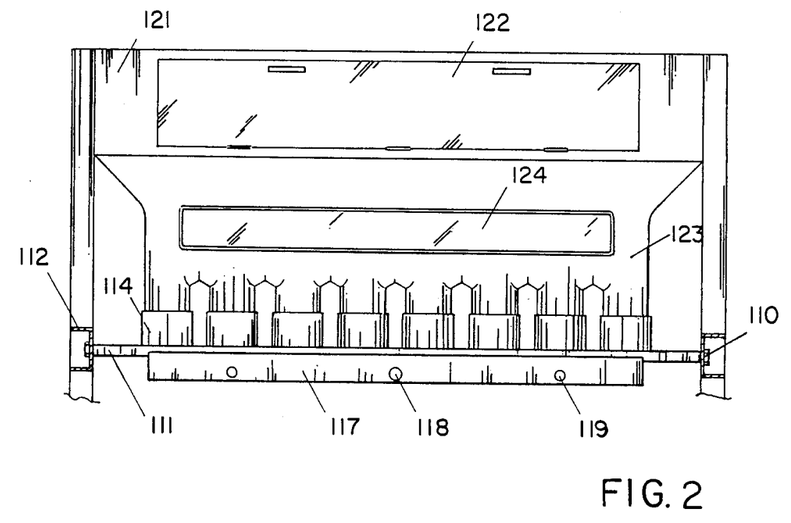
FIG. 2 is a longitudinally sectional view of a reserving means of this invention.
Figure 3:
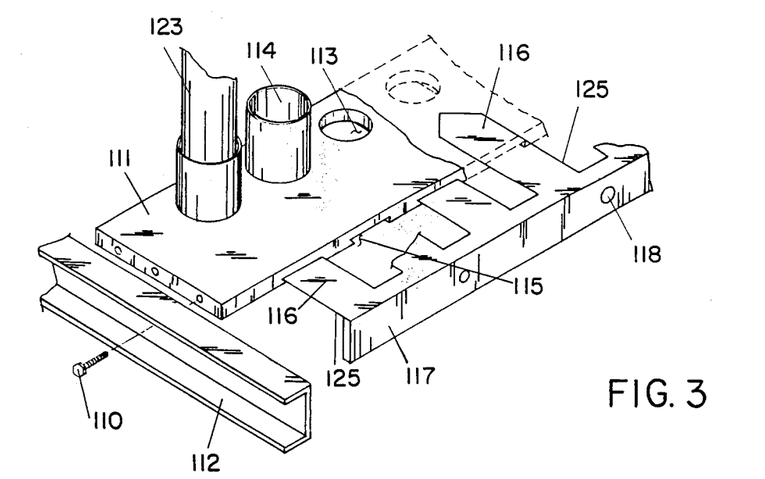
FIG. 3 is perspective view of FIG. 2 with the upper portion thereof partially taken off.

As shown in FIG. 1, a preferred embodiment of this invention comprises seven consequent steps to make stone fruit biscuit, that is, material reserving, material restoring, planing, sucking, moulding, baking and cooling. Correspondingly, a preferred embodiment of this invention comprises a material reserving means 1, a material restoring means 2, a planing means 3, a suction means 4, a moulding means 5, a baking means 6 and a cooling means 7.

As shown in FIGS. 2, 3, 4 and 5, the material reserving means 1 comprises a material reserving chamber 1A, a supporting plate 111 fastened with two ends respectively onto two 11 shaped metal bar 112 positioned on both sides of the material reserving chamber 1A, a plurality of perforations 113 bored on the supporting plate 111, a plurality of tubes 114 in a row each brazed with one end onto the perforation 113, a plurality of blade guiding grooves 115 on the bottom side of the supporting plate 111, the blade guiding grooves 115 extending past the perforation 113, a plurality of blades 116 fastened or brazed onto an actuating plate 117, a plurality of air cylinders 120 and guiding bolts (not shown and given reference numbers) mounted with one end within a plurality of orifices 118 bored on the actuating plate 117, a reservoir 121 for reserving the stone fruits therein, a hopper 122 on the upper portion of the reservoir 121 for supplying the stone fruits, a plurality of stone fruit conduits 123 in a row inserted within the tubes 114 and a window 124 to examine the stock of the stone fruits in the reservoir 121. When the air cylinder 120 is driven, the autuating plate 117 moves forward and the blades 116 cut right beneath the perforations 113 as a result of which the perforations 113 are closed. The feed of the stone furits in a predetermined quantity is thus accomplished. As shown in FIGS. 4, 5, 6 and 7, the material restoring means 2 comprises a material restoring chamber 2A, two opposite track frames 220 securely mounted on the walls of the restoring chamber 2A, each track frame 220 comprising two longitudinal flange tracks 234 and 242, two longitudinal roller tracks 231 and 243, the longitudinal roller track 243 sinking downward from the bottom portion 230 of the longitudinal flange track 242, two upper horizontal flange tracks 236 and 237. an upper horizontal roller track 238 extending under the bottom portion 230 of the longitudinal flange track 242, two lower horizontal flange tracks 240 and 241 and a lower horizontal roller track 244 under the lower horizontal flange track 241. The longitudinal flange track 242 and longitudinal roller track 243 are right beneath the stone fruit conduit 123. Two material conveying tube rows 210a and 210b are mounted between the two opposite track frames 220. Each of the material conveying tube rows 210a and 210b comprises a horizontal bar 218 at both ends of which two rollers 219 are respectively provided, a plurality of perpendicular bars 216 the lower ends of which are secured or brazed onto the horizontal bar 218, and a plurality of conveying tubes 211 the bottom portions of which are respectively perforated a bore 225 for the upper ends of the the perpendicular bars 216 to extend therethrough. The upper end of each perpendicular bar 216 is secured thereon a material seat 214 and, between the material seat 214 and the bottom portion of the conveying tube 211 a tension spring 213 is sleeved on the perpendicular bar 216. The conveying tubes 211 are connected by transverse rods 212 separated in a suitable distance from one another. Two material conveying tubes 211 in viwnity of the two opposite track frames 220 are respectively provided an upper flange 221 and a lower flange 222. And two perpendicular bars 217 in viwnity of the two opposite track frames 220 are respectively provided an adjustment ring 217 at the lower end thereof, the adjustment rings 217 being secured onto the perpendicular bars by means of screw bolt to ensure the dead point where the material seat 214 ascends as a result of which the material seat 214 would not ascend outside of the mouths of the conveying tubes 210.

Figure 4:
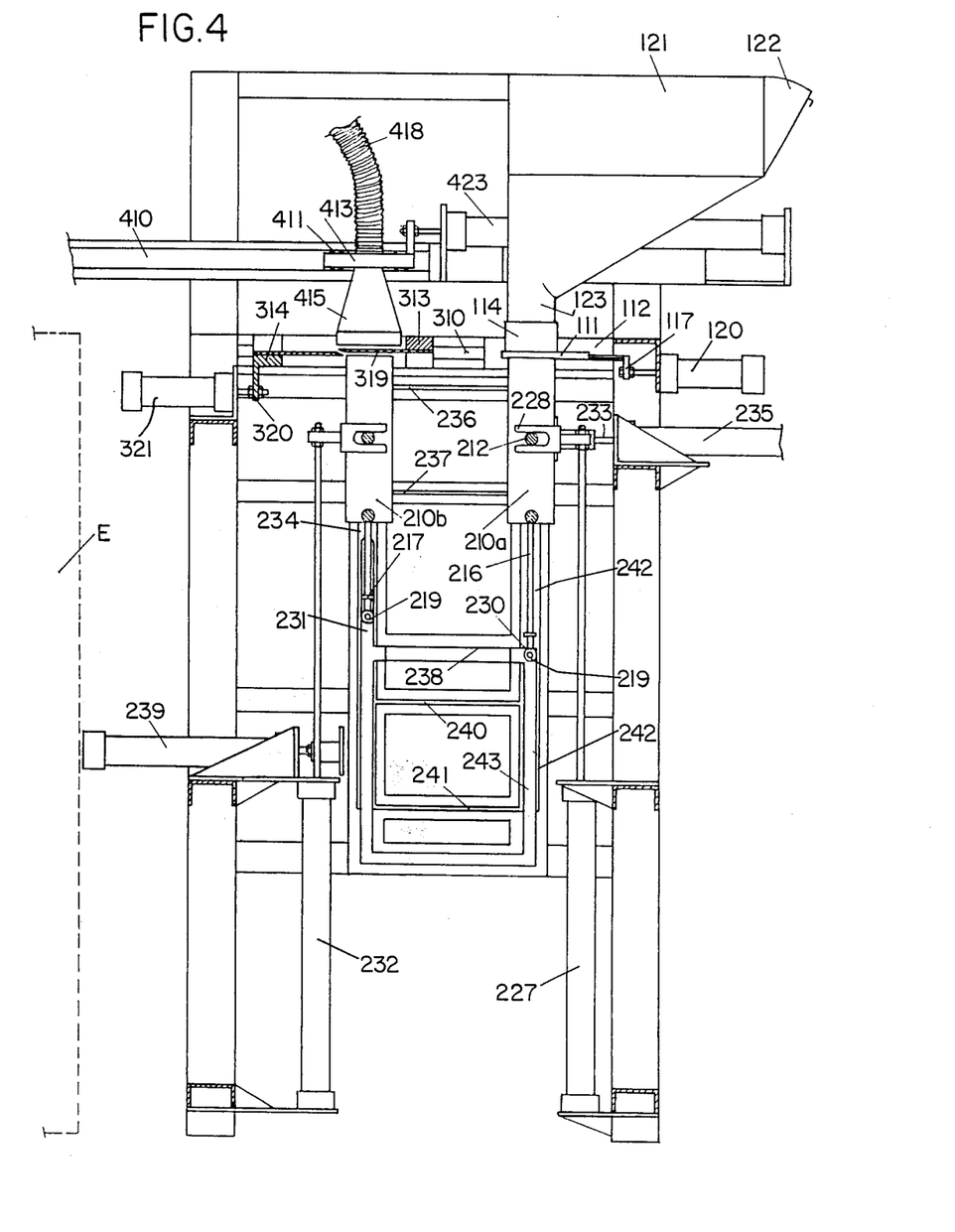
FIG. 4 is a longitudinally sectional view of a material reserving means, a material restoring means, a planing means and a suction means in combination of this invention in one position.
Figure 5:
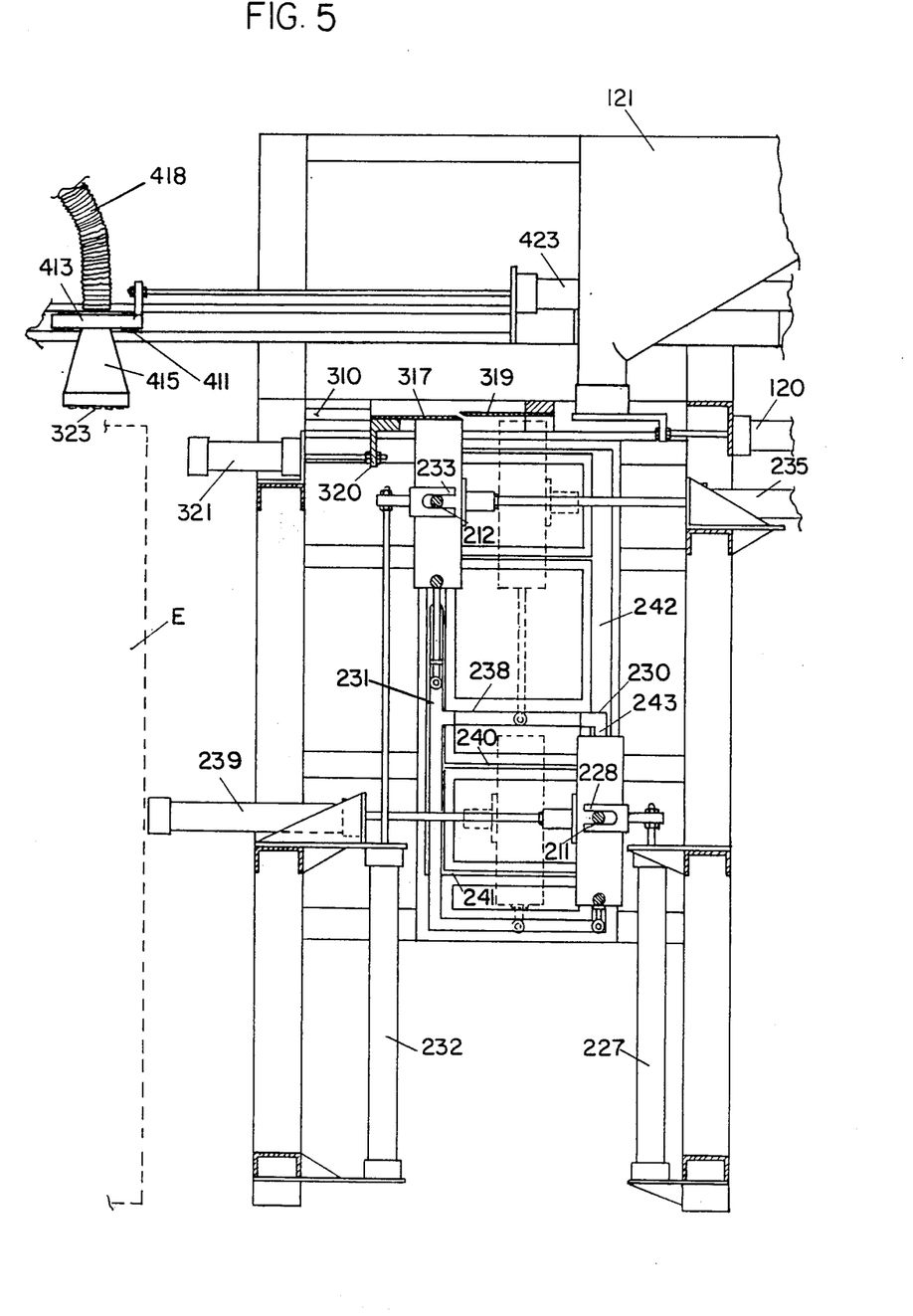
FIG. 5 is a longitudinally sectional view of a material reserving means, a material restoring means, a planing means and a suction means in combination of this invention in another position.
Figure 6:
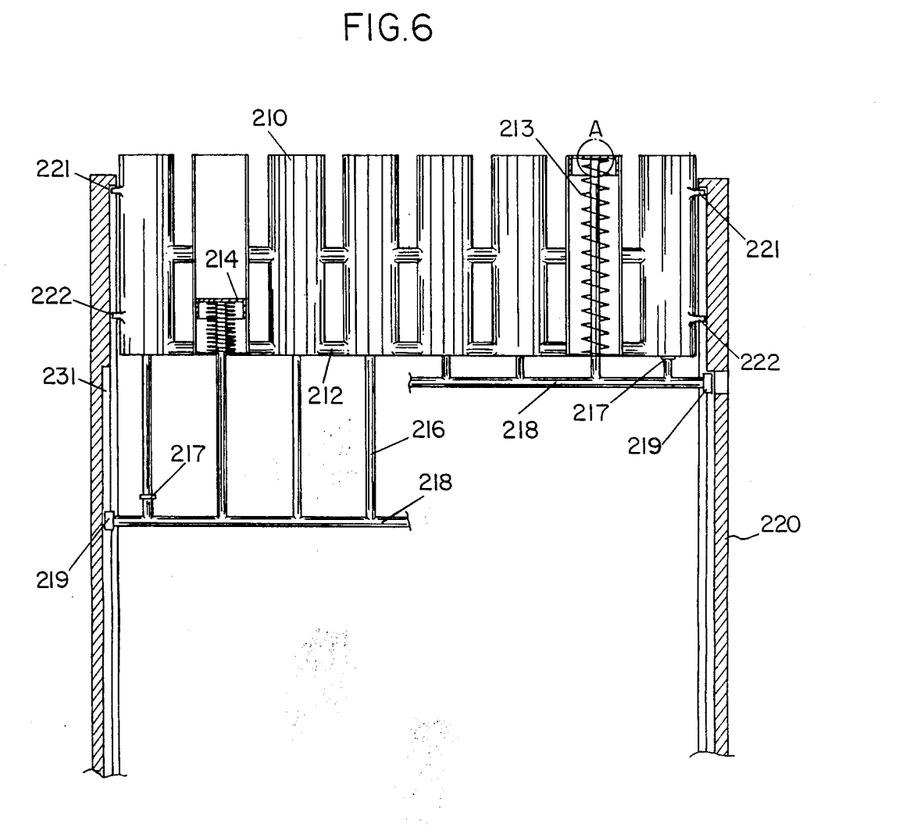
FIG. 6 is a side view of a material conveying tube row between two opposite track frames of this invention, partially perspective and partially sectional.
Figures 7A, 7B:
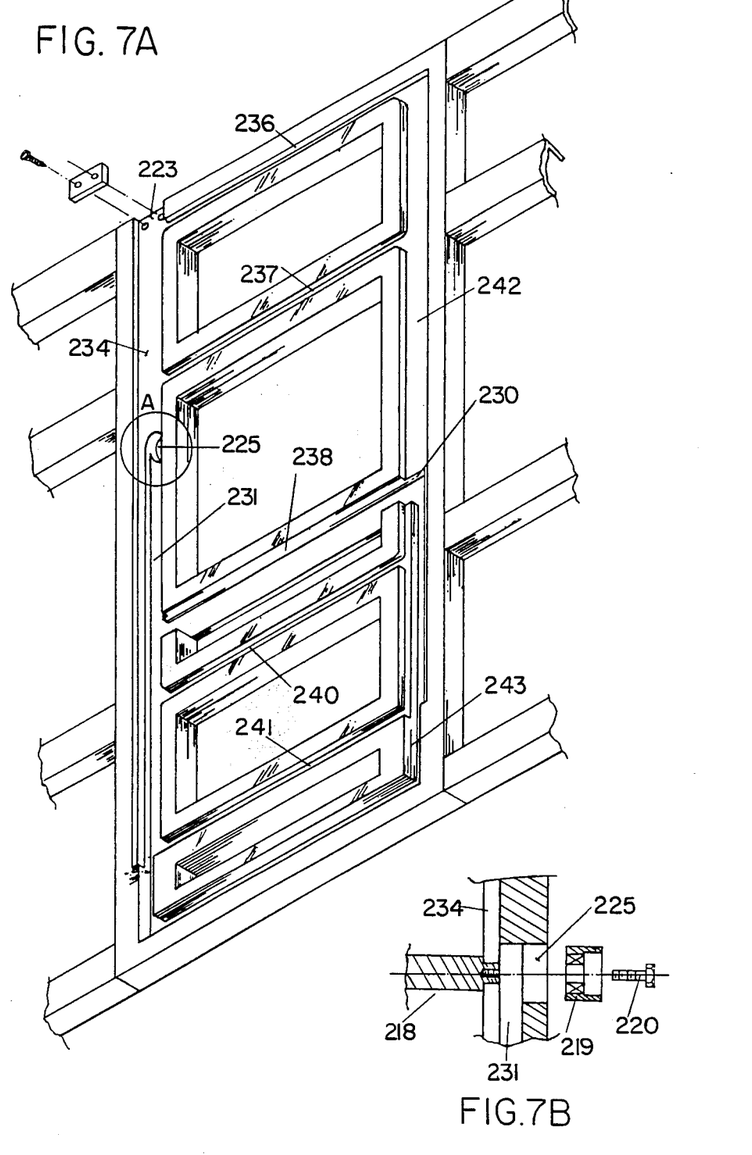
FIG. 7 is a perspective view of a track frame as shown in FIG. 6 with A portion sectioned.
Figure 8A:
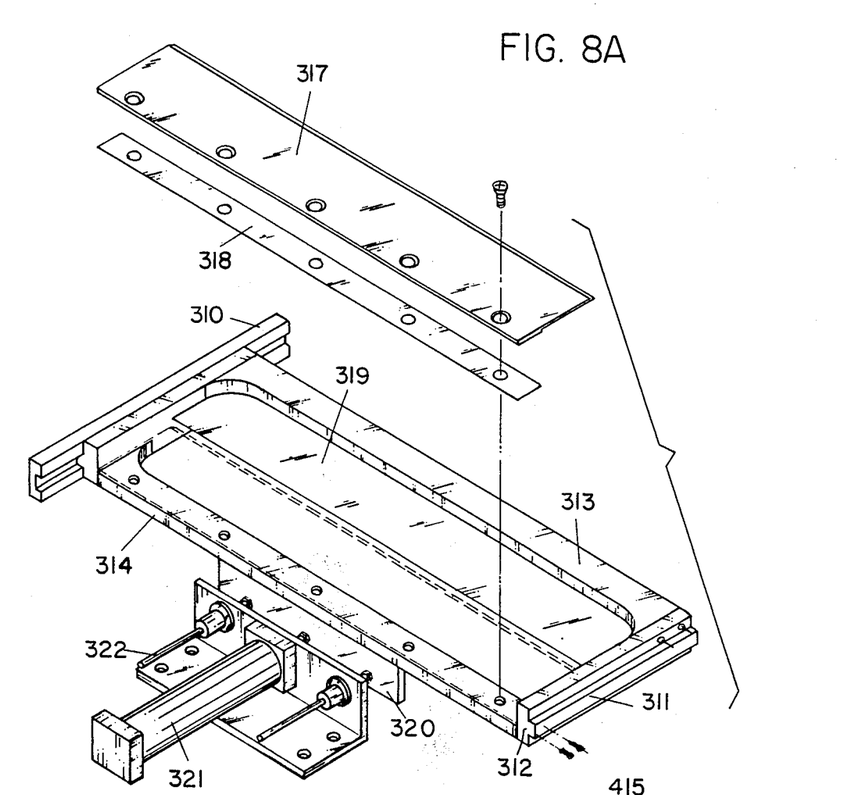
FIG. 8 is a perspective view of a dissembled planing means of this invention accompanying with a sectional view of the planing means.
Figure 8B:
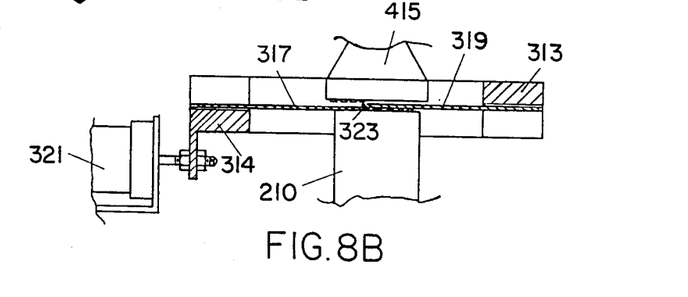

As shown in FIGS. 4 and 5, an upper transverse air cylinder 235 is mounted on one wall of the material restoring chamber 2A adjacent to the longitudinal flange track 242, a lower transverse air cylinder 239 on the opposite wall of the material restoring chamber 2A adjacent to the longitudinal flange track 234, a right lower perpendicular air cylinder 227 adjacent to the longitudinal roller track 243, and a left lower perpendicular air cylinder 239 adjacent to the longitudinal roller track 231. The upper transverse air cylinder 235, the lower transverse air cylinder 239, the right lower perpendicular air cylinder 227 and left lower perpendicular 232 are respectively provided with at least a clamp 228 at the outer end of driving rods thereof. However, for the conveying tube rows 210a and 210b to move more smoothly, the air cylinders 235, 239, 232 and 227 are better respectively provided with at least two clamps 228 and further respectively provided with two balancing rods 229. FIG. 4 shows the normal position of the conveying tube rows 210a and 210b where the conveying tube row 210a is right beneath the stone fruit conduit 123 with the upper flange 221 and lower flange 222 within the longitudinal flange track 242 and the roller 219 right under the bottom portion 230 of the longitudinal flange track 242, while the conveying tube row 210b extends with the upper flange 221 and the lower flange thereof within the longitudinal flange track 234 and the roller 219 thereof right under the bottom portion 230 of the longitudinal flange track 234. The bottom portion 230 of the longitudinal flange track 242 defines the dead point to which the rollers 219 of the conveying tube row 210a. Therefore, when the conveying tube row 210a ascends with the rollers 219 up to the bottom portion 230, the conveying tube row 210a will continue to ascend till each material seat 214 is pulled downward to the bottom of each conveying tube 211 by the perpendicular bar where the conveying tube row 210a waits to restore the material from the perforations 113 of the material reserving means 1.

Figure 9:
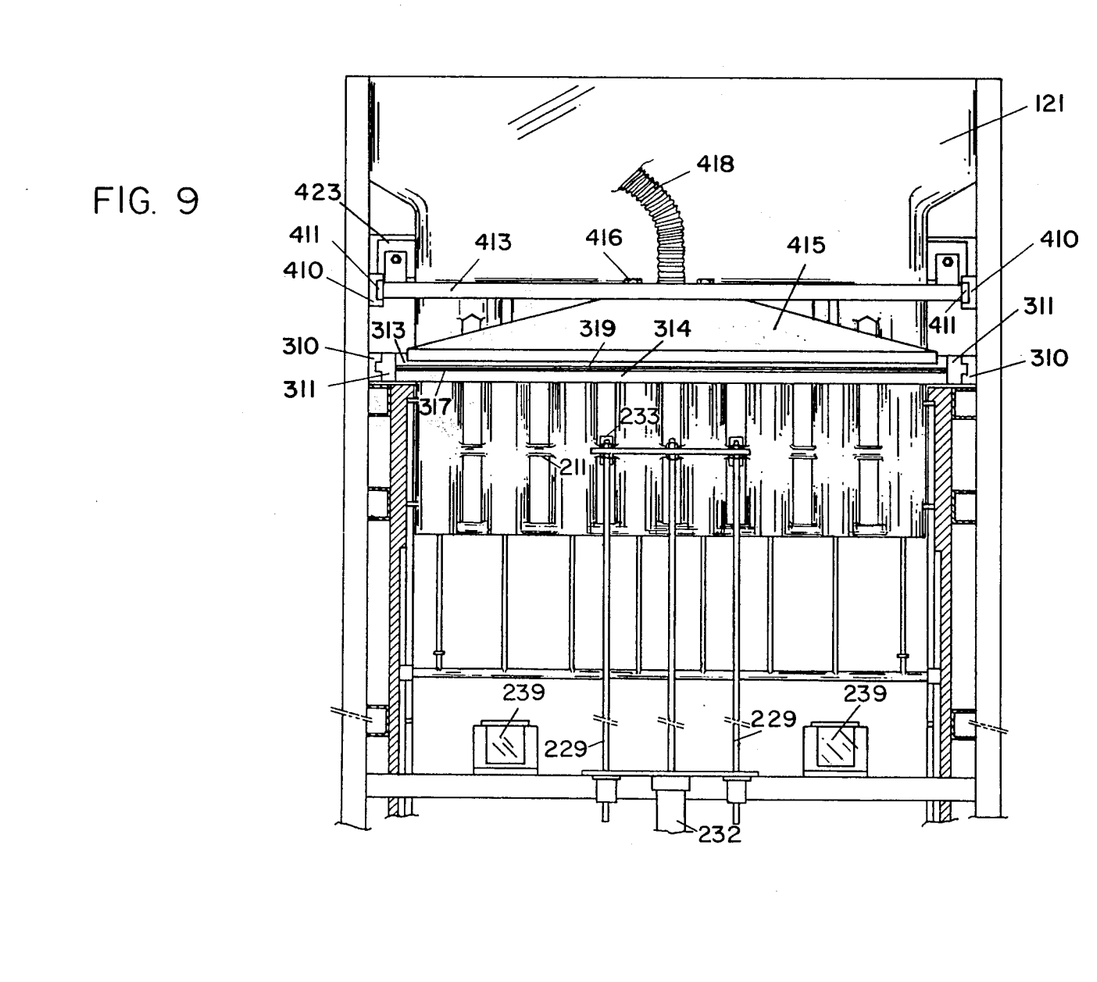
FIG. 9 is a view of a material restoring means, a planing means and a suction means in combination, of this invention, partially perspective and partially sectional.
Figures 10A, 10B, 10C, 10D, 10E, 10F:
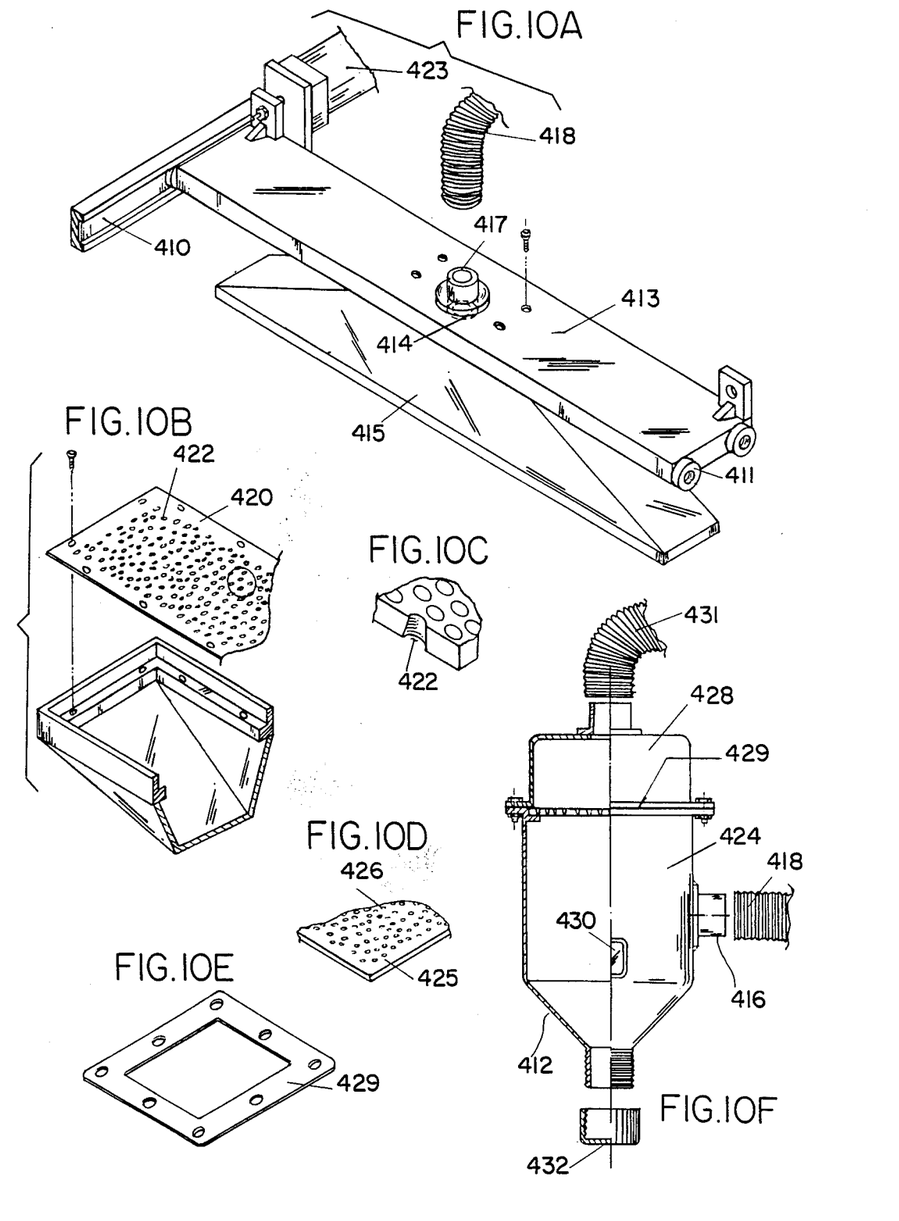
FIG. 10 is a perspective view of a suction means of this invention and a sectional view thereof accompanying with some views partially taken off.

As shown in FIGS. 4, 5 and 9, the planing means 3 above the track frames 220 comprises a planing chamber 3A, two track plates 312 opposite to each other, an upper blade seat 313 both ends of which are respectively secured onto the upper portions of two track plates 312, a lower blade seat 314 both ends of which are respectively secured onto the lower portions of two track frames 312, an upper blade 319 secured onto the bottom of the upper blade seat 313, a cutting blade 317 secured onto the surface of the lower blade seat 314, and a driving plate 320 secured onto the bottom of the lower blade seat 314. Between the cutting blade 317 and lower blade seat 314 there is provided an intermediate plate 318 for ensuring the tightness of joint. An air cylinder 321 with two balancing rods 322 on both sides thereof is connected with the driving plate 320. Two track plate 310 opposite to each other are secured onto walls of the planing chamber 3A. Each track plate 310 is provided a horizontal track (not given a reference number) and each plange plate 312 is provided a horizontal flange whereby the latter may move along the horizontal track. The distance between the upper blade 319 and cutting blade 317 defines the thickness of each planed stone fruit. And, the planing means 3 when driven moves toward the restoring means 2.

As shown in FIGS. 4, 5 and 9, the suction means 4 is provided above the planing means 3. FIG. 4 showns the normal position of the suction means 4 which comprises a suction chamber 4A, a sliding board 413 secured with at least two rollers at each end thereof, a bore 414 approximately at the middle portion of the sliding board 413, a tube connector 417 secured onto the surface of the sliding board 413 above the bore 414, a suction tube 418 sleeved onto the tube connector 417, a trapezoidal suction frame 415 secured onto the bottom of the sliding board 413 beneath the bore 414 and a suction plate 420 secured onto the inner edge of the lower portion of the trapezoidal suction frame 415. The suction plate 420 is bored a plurality of conical perforations 422 thereon. And, the sliding board 413 is mounted on two horizontal track bars 410 which are secured on the walls of the suction chamber 4A. The rollers 411 of the sliding board 413 are received within the tracks of the horizontal track bars 410. To drive the sliding board 413, an air cylinder 423 is provided on one side of the sliding board 413. As shown in FIGS. 4 and 5, the air cylinder 423 drives the sliding in a direction reverse to that in which the air cylinder 321 drives the planing means 3. The other end of the suction tube 418 is connected to a dust collector 412. The dust collector 416 comprises a lower barrel body 424, a distilling plate 425 inserted within the upper portion of the lower barrel body 424, an upper barrel body 428 secured onto the upper portion of the lower barrel body 424, a washer 429 secured between the lower barrel body 424 and upper barrel body 428. The lower barrel body 424 is provided with a tube connector 416 at the side thereof, a mouth 417 at the lower end thereof, and an examination window 430 at the side thereof. Screwed onto the mouth 417 is a cap 432. The upper barrel body 428 is provided with a tube connector 419 at the upper portion to connect one end of a blow tube 431 the other end of which is connected to a blowing fan (not shown and given a reference number).

Figures 11A, 11B, 11C:
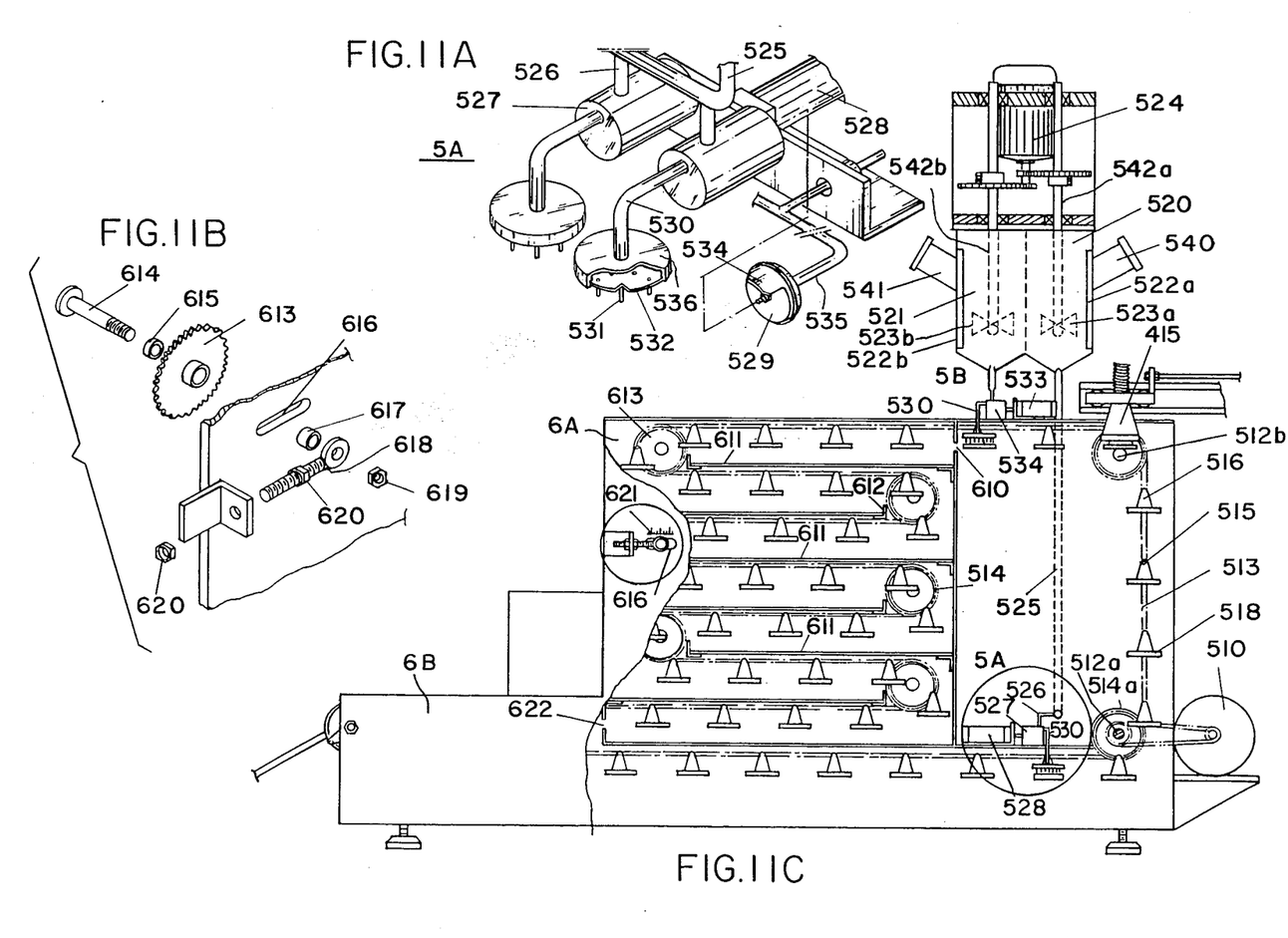
FIG. 11 is a view of a moulding means and a baking means of this invention accompanying with a perspective view to show a means to provide the dough and a perspective view to show a means to adjust the tightness of chains 513.
Figures 12A, 12B, 12C, 12D:
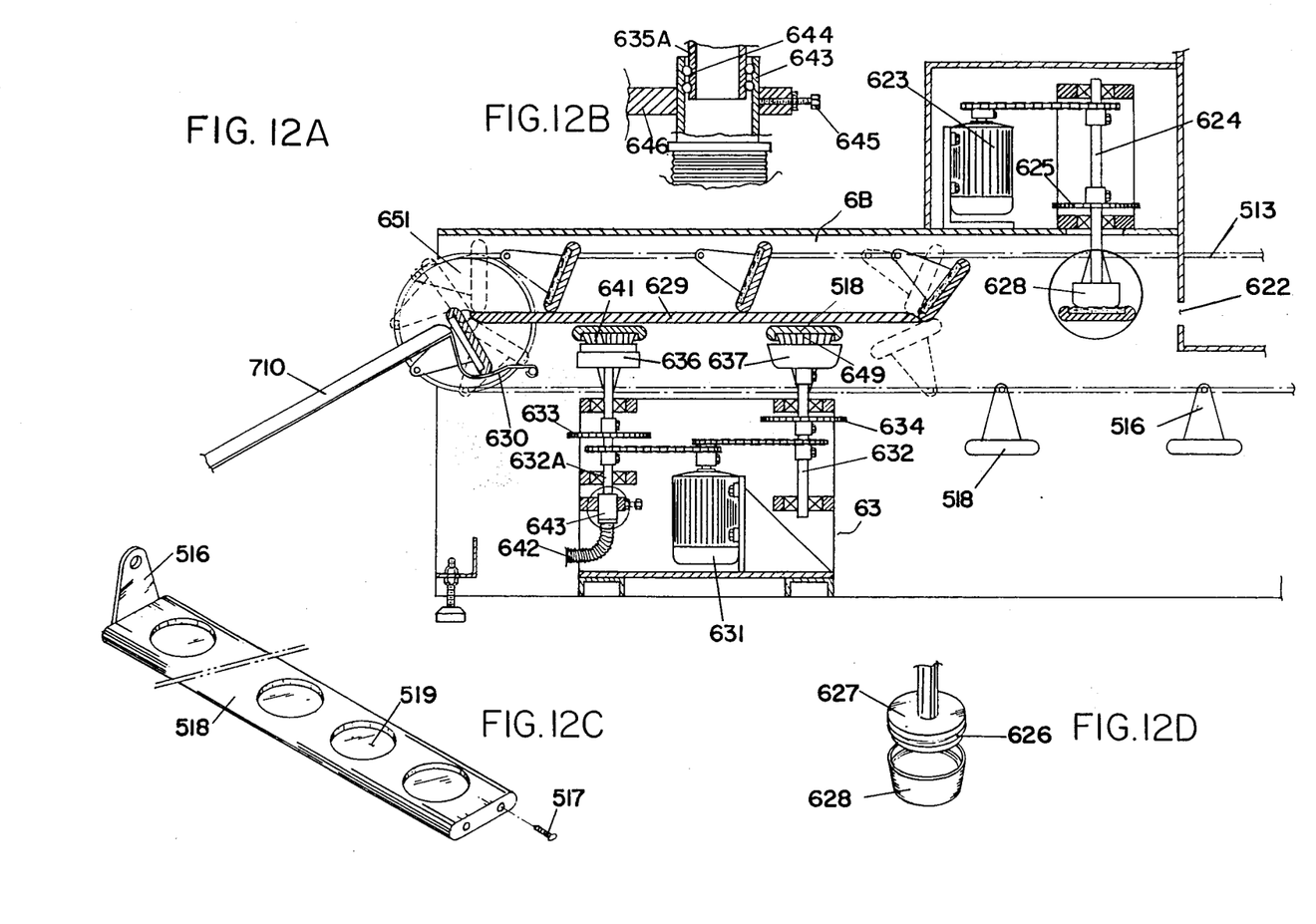
FIG. 12 is mainly a sectional view of a baking means of this invention partially taken off accompanying with a perspective view of a moulding plate, a perspective view of a releasing head and a sectional view to show more detailedly the portion of a sleeve tube.

FIG. 5 shown the dead point to which the suction means 3 moves. As shown in FIG. 1, the moulding means 5 is provided under the suction means 4, particularly under the suction means 4 which moves to the dead point. The moulding means 5 comprises a moulding chamber 511 under the suction means 4 which moves to the dead point, a driving shaft 512 driven by a motor 510, the driving shaft 512 being movably supported on the walls of said moulding chamber 511 a pair of chain wheels 514a securely mounted on both ends of the driving shaft 512a, an upper driven shaft 512b movably mounted on the walls of the moulding chamber 511, the driving shaft 512a being provided beneath the dead point where the suction means 4, a pair of upper chair wheels 514b securely mounted on both ends of the driven shaft 512b, a base dough barrel 520 mounted on the upper wall of the moulding chamber 511, the base dough barrel 520 being provided above the moulding chamber 511 and particularly at the next position to the upper chain wheels 514b, a surface dough barrel 521 mounted on the upper wall of the moulding chamber 511, the surface dough barrel 521 being provided above the moulding chamber 511 and particularly adjacent to the base dough barrel 520, two chains 513 running across the lower and upper chain wheels 514a and 514b, and a plurality of moulding plates 518 each suspended between the chains 513. The route which the chains 513 moves along will be more clear when described in combination with the baking means 6. The base dough is thicker than the surface dough. The base dough is applied to mould into the cake body while the surface dough is applied for the planed stone fruit to coat on the moulded cake body. As shown in FIG. 12, the moulding plate 518 comprises a plurality of moulds 519 shaped on the moulding plate 518 and a pair of hanging ears 516 secured onto both ends of the moulding plate 518. The hanging ear 516 is bored a perforation at the upper portion thereof for a pin 515 to extend through, the pin further extending through between each adjacent links of the chains 513. The moulding plate 518 mounted between the chains 513 maintains horizontal. As shown in FIG. 11, the base dough barrel 520 is provided with a base dough inlet 540 for the base dough to be poured in and a base dough examination window 522a to examine from outside the actual amount of the base dough, while the surface dough barrel 521 is provided with a surface dough inlet 541 for the surface dough to be pour in and a surface dough examination window 522b to examine from outside the actual amount of the surface dough. A driven shaft 542a extends into the base dough barrel 520 with one end onto which a mixing blade 523 is secured, while a driven shaft 542b extends into the surface dough barrel 521 with one end onto which a mixing blade 523b is secured. The driven shafts 542a and 542b are driven by a motor 524 by means of gears, the motor 524 being mounted on the machine body. At the lower end of the base dough barrel 520, a base dough exhausting means 5A is provided. Accordingly, a main tube 525 extends downward between each chain 513 and the adjacent wall of the moulding chamber 511 to ensure that the main tube 520 does not interrupt the motion of the chains 513. As shown in FIG. 11, to the main tube 525 there are connected a plurality of branch tubes 526 in a row, the lower end of each branch tube 526 communicating with a pump 517 a piston shaft 535 of which is driven by an air cylinder 528. Onto the front end of the piston shaft 535 there is secured a piston 529 and further onto the piston 529 there is secured a damper 534. A conduit 530 is connected with one end to each pump 527, and the other end to a disc 536 onto the lower circumference of which an exhaust plate 532 is secured. The exhaust plate 532 is provided with a plurality of exhaust orifices within each of which an injector 531 is securely inserted. For the surface dough to flow out and coat on the moulded biscuits conveyed by each moulding plate 518, a surface dough exhausting means 513 is provided under the surface dough barrel 521. The surface dough exhausting means 513 is correspondingly similar to the base dough exhausting means 5A in structure. As shown, the surface dough exhausting means 513 applies an air cylinder 533 to drive the piston shaft thereof.

Figure 13A:
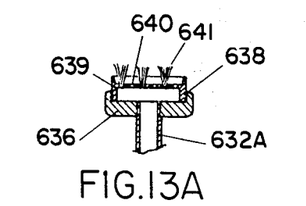
FIG. 13 is mainly a sectional view of a baking means as shown in FIG. 12 partially taken off, accompanying with a sectional view to show a cleaning disc and a sectional view to show an oil coating disc.
Figure 13B:
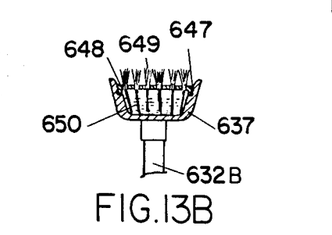
Figure 13C:
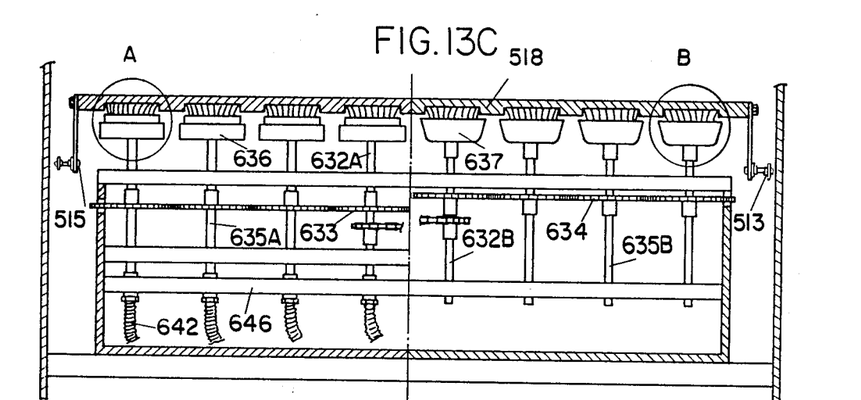
Figure 14:
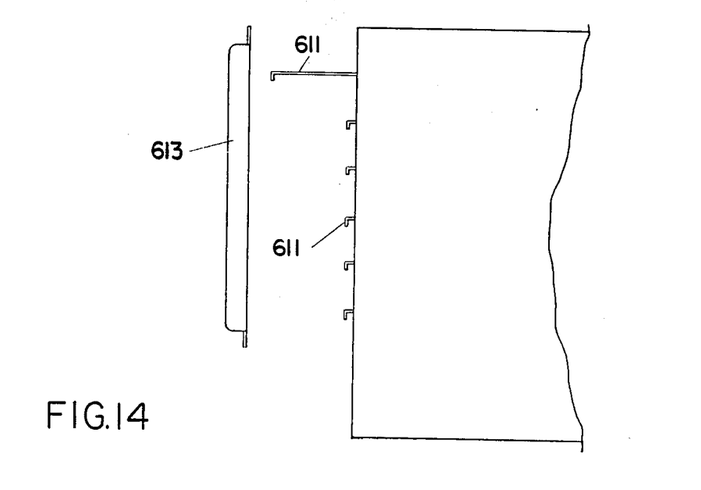
FIG. 14 is a sectional view of a baking means as shown in FIG. 12 partially taken off.

As shown in FIG. 1, the baking means 6 is provided at the position horizontally next to the moulding means 5. The moulding means 5 comprises a baking chamber 6A and a reversing chamber 6B. As shown in FIG. 11, a plurality of heating coil frames 612 are horizontally mounted on the walls of the baking chamber. On the heating coil frames 612 are heating coils 611 which are connected with power supply. There is an upper gap 610 provided at the upper portion of the perpendicular wall which separate the moulding chamber 511 and the baking chamber whereby the moulding plate 518 may enter therethrough. At the perpendicular wall betweem the baking chamber 6A and reversing chamber 6B, a lower gap 622 is provided for the moulding plate 518 coveyed by the chain 513 to pass through. As shown there are a plurality of floors of heating coils 611, at each turning position of the chain 513, a pair of chain wheels 613 is on a provided. As shown in FIG. 11, each of a pair of chain wheels 613 is mounted onto a screw bolt 614 with a bearing 615 there between. At the corresponding position of the baking chamber wall, a slot 616 is bored for the threaded end of the screw bolt 614 to extend through. The screw bolt 614 extend with the threaded end further through a sleeve 617 for an adjustment nut 619 to screw thereon. On the baking chamber wall a screw bolt seat (not given a reference number) is seured. An adjustment screw bolt 618 extends through the screw bolt seat to bias with the front end against the adjustment nut 619 on which a graduate 621 is provided for conveniently adjusting. For the adjustment screw bolt 618 to fasten and release, at least an adjustment nut 620 is screwed thereon. As shown in FIGS. 11 and 13, at one wall of the baking chamber 6A, particularly at the porition corresponding to each floor of heating coil 611, an opening is provided for the heating coils to be subject to maintainance. Further, a cover 613 is secured onto the baking chamber wall to cover the operings.

As shown in FIG. 12, above the reversing chamber 6B a motor 623 is mounted. By means of gears, a plurality of driving shafts 624 are connected to and driven by the motor 623. Each driving shaft 624 extends with the lower end into the reversing chamber 6B. Secured onto the lower end of each driving shaft 624 is a releasing head 628. The number and porition of the releasing head 628 is corresponding to those of the mould on the moulding plate 518. Each releasing head 628 comprises a disc 627 with a groove 626 along the outer circumference thereof and a head portion 628 with a flange (not given a reference number) along the inner circumference thereof. The head portion 628 is made of silicon and sleeved onto the disc 627. At the upper left end of the reversing chamber 6B, a pair of chain wheels 651 is mounted. A releasing plate 629 is mounted between the chain wheels 651 and the releasing heads 628. The front edge of the releasing plate 629 has a slopping portion (not given a reference number) which faces upwardly while the rear edge thereof has a slopping portion (not given a reference number) which faces downwardly. The releasing plate 629 is suspended a little higher than the moulding plates 518 whereby the moulding plate 518 which pass through the releasing heads 628 and further toward the releasing plate 629 will be biased by the sloping portion at the front edge of the releasing plate 629. Between the chain wheel pair 651 is an opening (not given a reference number) into which the upper end of a slide 710 extends. Out of the upper end of the slide 710 a curved plate 630 extends with the front edge thereof slightly tipped upwardly whereby the moulding plates which is pulled by the chain 513 along the surface of the releasing plate 629 will release the moulded stone fruit biscuit into the slide 710. The rear edge of the releasing plate 629 extends short of the upper end of the slide 710 as a result of which the moulding plates 518 immediately after passing the rear end of the releasing plate 629 will fall into the space between the releasing plate 629 and curved plate 630. Under the releasing plate 629 a cleaning and oil coating apparatus 63 is mounted on the base of the reversing chamber 6B. As shown in FIGS. 12 and 13, the cleaning and oil coating apparatus 63 comprises a motor 631, a first main shaft 635A driven by the motor 631, a second main shaft 635B driven by the motor 631, a first driven shaft 632A transmitted by the first main shaft 635A by means of gears 633, a second driven shaft 632B transmitted by the second main shaft 635B by means of gears 634, a row of cleaning discs 636 each secured onto the upper end of the first driven shaft 635A, and a row of oil coating discs 637 each secured onto the upper end of the second driven shaft 635B. As shown in FIG. 13, each driven shaft 635A which is longitudinally hollow is screwed onto the lower portion of each cleaning disc 636. A brush head 639 which is opened at the lower portion is screwed onto the upper portion of each cleaning disc 636. A plurality of bristles 641 is rooted on the brush head 639 and between bristles 641 there are perforated a plurality of small openings 641. The lower end of the first driven shaft 635A is inserted into a sleeve tube 643 which is secured on a seat 546 by means of a screw bolt 645. Attached to the lower end of each sleeve tube 643 is a suction tube 642 whereby the brush head 639 may polish the moulding plate 518 which faces downward with the moulds 519 and the crumbs thus polished down will be further sucked off. As shown in FIGS. 12 and 13, the oil coating disc 637 which is at the next position to the cleaning disc 636 is screwed onto the upper end of the second driven shaft 632B which is solid. The oil coating disc 637 like a bowl in shape is filled with oil therein. An oil coating head 648 which is rooted thereon a plurality of bristles 649 is screwed onto the upper portion of the oil coating disc 637. In the center of each hank of bristles is provided a cotton thread 650 which may absorb the oil up according to capillary attraction.

Figures 15A, 15B, 15C:
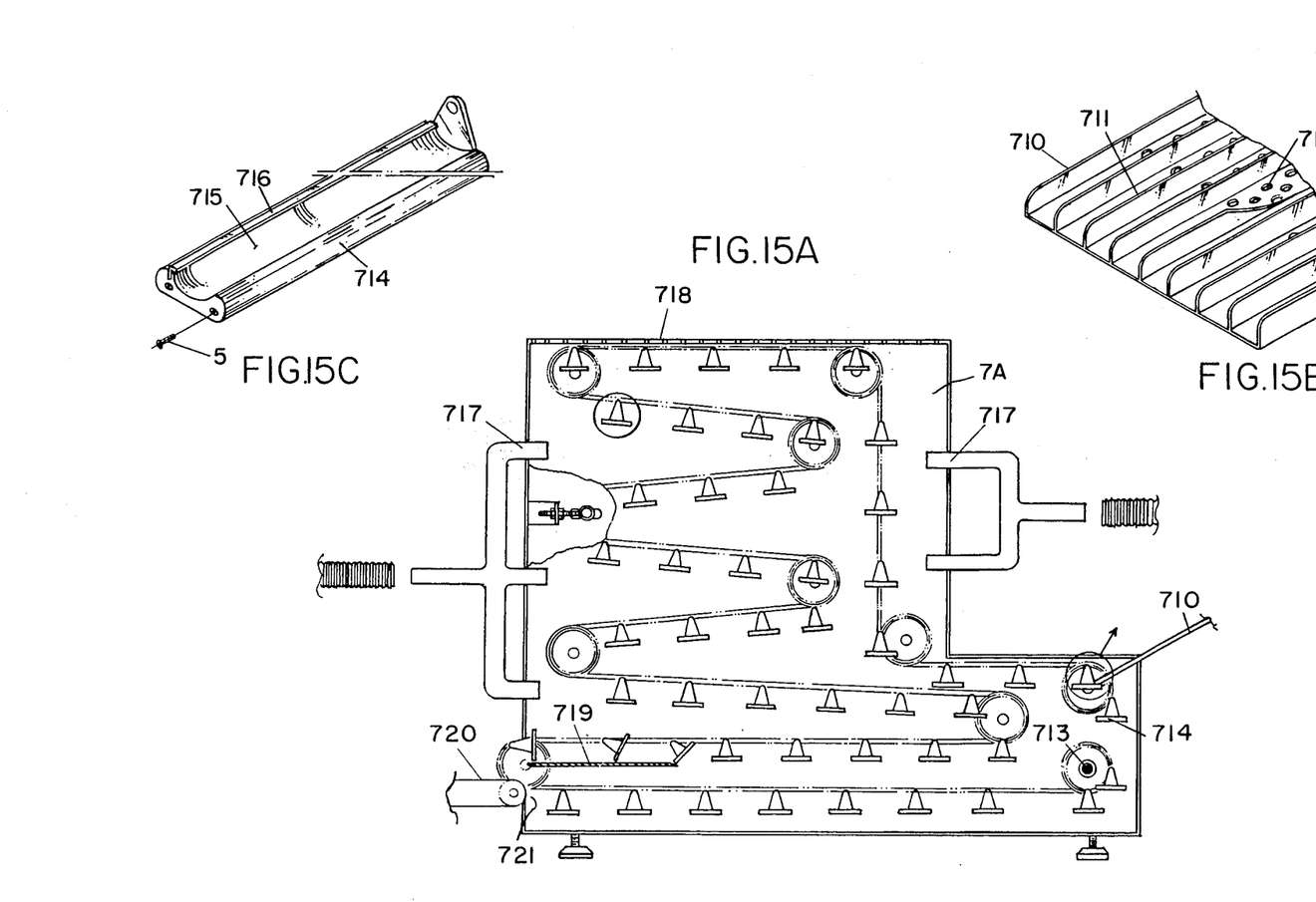
FIG. 15 is mainly a sectional view of a cooling means of this invention accompanying with a perspective view of a slide and a perspective view of a shaping plate.

As shown in FIG. 15, the cooling means 7 comprises a cooling chamber 7A, a plurality of chain wheels 711A mounted on the walls of the cooling chamber 7A, a transmission shaft 713 on both ends of which a pair of chains are respectively mounted, the transmission shaft 713 being driven by the motor 510, two chains 711B being respectively mounted between the chain wheels on one side and the opposite side of the cooling chamber 7A, a checking plate 719 mounted on the walls of the cooling chamber 7A, the checking plate 719 having a sloping portion facing upwardly, a plurality of shaping plates 714 suspended between the two chains 711B, a plurality of cooling air tubes 717 extending into the cooling chamber 7A, and an outlet 721 opened on one wall of the cooling chamber 7A at the rear end of the checking plate 719. A conveyor 720 is mounted on the machine body immediately outside of the outlet 721 to receive the cooled stone fruit biscuits thereon and convey off. The slide 710 as described above is provided with a plurality of separation plates 711 and a plurality of bores 712, the latter being applied to let fall the crumbs. The slide 710 extends into the front portion of the cooling chamber 7A, the lower edge of which is position in such a way that the shaping plates 714 passing there will receive the released stone fruit biscuits. The checking plate 714 has a longitudinally curved groove 715 and a silicon strip 716 is provided at one edge of the groove 715 whereby the released stone fruit biscuits which fall upon the shaping plate 714 will not get broken and further bend into shaft due to the curvatue of the curved groove 715. The checking plate 719 is a little higher than the shaping plates 714 whereby the 714 will be biased upwardly by the slopping portion of the checking plate 719. When the shaping plates 714 move at the rear end of the checking plate 719, the cooled stone fruit biscuits conveyed by the shaping plates 714 will be unloaded into the conveyor 720.

What I claim is:

1. An automatic machine for making stone fruit biscuit comprising a material reserving means which comprises a material reserving chamber, a supporting plate secured onto the walls of said material reserving chamber, a plurality of perforations bored on said supporting plate, a plurality of tubes in a row each brazed with one end onto said perforation, a plurality of blade guiding grooves on the bottom side of said supporting plate, said blade guiding grooves extending past said perforations, a plurality of blades extending into said guiding grooves, an actuating plate 117 on which said blades are mounted, at least an air cylinder to drive said actuating plate, a hopper secured onto the walls of said material reserving chamber above said tubes, said hopper being provided with a plurality of stone fruit conduits in a row inserted within said tubes;

a material restoring means which comprises a material restoring chamber next to said material reserving chamber, two opposite track frames securedly mounted on the walls of said material restoring chamber, two material conveying tube rows mounted between said two opposite track frames, two transverse air cylinders and two perpendicular air cylinders mounted on the walls of said material restoring chamber to alternatively drive said material conveying tube rows perpendicularly and horizontally, a planing means above said track frames, said planing means comprising a planing chamber, two track plates opposite to each other, said two track plates being secured onto the walls of said planing chamber, an upper blade seat both ends of which are respectively secured onto the upper portions of said two track plates, a lower blade seat both ends of which are respectively secured onto the lower portions of said two track frames, an upper blade secured onto the bottom of said upper blade seat, a cutting blade secured onto the surface of said lower blade seat, a driving plate secured onto the bottom of said lower blade seat and an air cylinder connected with said driving plate;

a suction means above said planing means, said suction means comprising a suction chamber, two horizontal track bars secured on the walls of said suction chamber, a sliding board secured with at least two rollers at each end thereof, said rollers being movably received within the tracks of said track bars, a bore approximately at the middle portion of the sliding board, a tube connector secured onto the surface of said sliding board above said bore, a suction tube sleeved onto said tube connector, a trapezoidal suction frame secured onto the bottom of said sliding board beneath said bore, a suction plate secured onto the lower portion of said traperoidal suction frame, said suction plate being bored a plurality of perforations thereon, a dust collector connected to one end of said suction tube, and an air cylinder on one side of said sliding board;

a moulding means under said suction means, said moulding means comprising a moulding chamber, a driving shaft driven by a motor, said driving shaft being movably supported on the walls of said moulding chamber, a pair of chain wheels securedly mounted on both ends of said driving shaft, an upper driven shaft movably mounted on the walls of said moulding chamber, a pair of upper chain wheels securedly mounted on both ends of said driven shaft, a base dough barrel mounted on the upper wall of said moulding chamber, a surface dough barrel mounted on the upper wall of said moulding chamber, said base dough barrel and surface dough barrel being adjacent to each other, two chains running across said lower and upper chain wheels and a plurality of moulding plates each suspended between said chains;

a baking means horizontally next to said moulding means, said baking means comprising a baking chamber next to said moulding chamber, an upper gap provided at the upper portion of the perpendicular wall which separate said moulding chamber and said baking chamber whereby said moulding plates may enter therethrough, a reversing chamber next to said baking chamber, a lower gap provided at the wall between said baking chamber and said reversing chamber whereby said moulding plates may pass through, a plurality of heating coil frames horizontally mounted on the walls of said baking chamber, a plurality of heating coils on said heating coil frames, said heating coils being connected with a power supply, a plurality of pairs of chain wheels mounted on the walls of said baking chamber, each pair being at each turning position of said chains which runs from said chain wheels in said moulding chamber, a plurality of releasing heads in a row driven by a motor, said releasing heads extending into said reversing chamber, a pair of chain wheels mounted at the upper left end of said reversing chamber for said chains to run from said baking chamber into said reversing chamber and back to said chain wheels in said moulding chamber, a releasing plate mounted between the upper left end of said reversing chamber, a slide extending into said opening, said slide having a curved plate at the upper end thereof, and a cleaning and oil coating apparatus mounted on the base of said reversing chamber; and a cooling means next to said reversing chamber, said cooling means comprising a cooling chamber, a plurality of chain wheels mounted on the walls of said cooling chamber, a transmission shaft on both ends of which a pair of chains are respectively mounted, said transmission shaft being driven by said motor which drives said driving shaft in said moulding chamber, a plurality of shaping plates suspended between said pair of chains, a plurality of cooling air tubes extending into said cooling chamber, a checking plate mounted on the walls of said cooling chamber at the lower portion thereof, an outlet opened on one wall of said cooling chamber at the rear end of said checking plate, a conveyor immediately outside of said outlet.

2. An automatic machine for making stone fruit biscuit according to claim 1 wherein each said track frame comprises two longitudinal flange tracks, two longitudinal roller tracks, one of said longitudinal roller tracks sinking downward from the bottom portion of one of said longitudinal flange tracks, two upper horizontal flange tracks, an upper horizontal roller track extending under said bottom portion of said one of said longitudinal flange track, two lower horizontal flange tracks under said upper horizontal roller track, and a lower horizontal roller track under said lower horizontal flange track.

3. An automatic machine for making stone fruit biscuit according to claim 1 wherein each said moulding plate comprises a plurality of moulds shaped on said moulding plate and a pair of hanging ears secured onto both ends of said moulding plate, said hanging ear being bored a perforation at the upper portion thereof for a pin to extend through, said pin further extending through between each adjacent links of said chains.

4. An automatic machine for making stone fruit biscuit according to claim 1 wherein said base dough barrel is provided with a base dough inlet for the base dough to be poured in and a base dough examination window while said surface dough barrel is provided with a surface dough inlet for the surface dough to be poured in and a surface dough examination window; and a driven shaft extends into said base dough barrel with one end onto which a mixing blade is secured, while another driven shaft extends into said surface dough barrel with one end onto which another mixing blade is secured.

5. An automatic machine for making stone fruit biscuit according to claim 4 wherein a base dough exhausting means is povided at the lower end of said base dough barrel, said base dough exhausting means comprising a main tube extending doward from the lower end of said base dough barrel, a plurality of brach tubes in a row connected to said main tube, a plurality of pumps each connected to each said brach tube, pistons of each said pumps being driven by an air cylinder, a plurality of conduits each connected with one end to one of said pumps and the other end to a disc, and a plurality of exhaust plates each mounted onto one of said discs, each of said exhaust plates being provided with a plurality of exhaust orifices within each of which an injector is securedly inserted.

* * * * *